(12) United States Patent
Srivastava et al.

(10) Patent No.: US 10,839,010 B2
(45) Date of Patent: Nov. 17, 2020

(54) COMPACT VISUALIZATION OF QUERY SEARCH RESULTS

(71) Applicant: International Business Machines Corporation, Armonk, NY (US)

(72) Inventors: Biplav Srivastava, Noida (IN); Srikanth Govindaraj Tamilselvam, Chennai (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 452 days.

(21) Appl. No.: 14/788,587

(22) Filed: Jun. 30, 2015

(65) Prior Publication Data

US 2017/0004183 A1    Jan. 5, 2017

(51) Int. Cl.
    *G06F 16/838*    (2019.01)
    *G06F 16/832*    (2019.01)

(52) U.S. Cl.
    CPC .......... *G06F 16/838* (2019.01); *G06F 16/832* (2019.01)

(58) Field of Classification Search
    CPC ............................. G06F 16/832; G06F 16/838
    See application file for complete search history.

(56) References Cited

U.S. PATENT DOCUMENTS

| | | |
|---|---|---|
| 6,271,840 B1 | 8/2001 | Finseth et al. |
| 8,037,071 B2 | 10/2011 | Venkataraman et al. |
| 8,370,331 B2 | 2/2013 | Pontier et al. |
| 8,694,526 B2 | 4/2014 | Costello et al. |
| 8,768,908 B2 | 7/2014 | Chowdhury et al. |
| 2006/0004716 A1* | 1/2006 | Hurst-Hiller ....... G06F 16/9535 |
| 2006/0179035 A1* | 8/2006 | Broker ................ G06F 16/9038 |
| 2007/0033169 A1* | 2/2007 | Friedman ............ G06F 16/2477 |
| 2009/0187558 A1* | 7/2009 | McDonald ............ G06F 16/338 |
| 2011/0264681 A1* | 10/2011 | Kimberlin ......... G06F 16/90332 |
| | | 707/767 |
| 2012/0005198 A1* | 1/2012 | Pontier ................ G06F 16/248 |
| | | 707/723 |

(Continued)

FOREIGN PATENT DOCUMENTS

WO    WO2008080114 A1    7/2008

OTHER PUBLICATIONS

Di Marco, Antonio, et al., "Clustering and Diversifying Web Search Results with Graph-Based Word Sense Induction", Association for Computational Linguistics, 2013, 46 pages, MIT Press Journals, Cambridge, MA, USA.

(Continued)

*Primary Examiner* — William Spieler
(74) *Attorney, Agent, or Firm* — Ference & Associates, LLC

(57) ABSTRACT

Methods and arrangements for displaying results of one or more query searches. Query search results are obtained and there are determined, from the query search results, a best object type, a best instance of the best object type and one or more alternative object types, wherein determining a best object type includes consulting a collection of domain ontologies. The search results are displayed on a single screen via showing the best object type, the best instance of the best object type and the one or more alternative object types. Other variants and embodiments are broadly contemplated herein.

15 Claims, 7 Drawing Sheets

(56) References Cited

U.S. PATENT DOCUMENTS

2013/0054583 A1* 2/2013 Macklem ............ G06F 16/9535
707/723
2013/0198174 A1 8/2013 Poznanski et al.
2015/0286643 A1* 10/2015 Kumar ................ G06F 16/9535
707/728

OTHER PUBLICATIONS

Hemayati, Reza, et al., "Semantic-Based Grouping of Search Engine Results Using WordNet", Springer Lecture Notes in Computer Science (LNCS), 2007, 9 pages, Springer-Verlag, Berlin, Germany.
Osinski, Stanislaw, et al., "A Concept-Driven Algorithm for Clustering Search Results", IEEE Intelligent Systems, 2005, 7 pages, IEEE Computer Society, Washington, D.C., USA.

* cited by examiner

COMPACT VISUALIZATION OF QUERY SEARCH RESULTS

BACKGROUND

Generally, query-based searching has become a commonplace activity for users from different interfaces such as those associated with desktop computers, or mobile devices such as laptop computers, tablets and mobile phones (e.g., smart phones). There exist various methods and arrangements for listing search results, among which one of the most common is to list, in descending order, a score based on a predetermined confidence algorithm. Since search results tend to span multiple pages, a user can easily become discouraged or even give up after looking through perhaps the first few pages of results. Generally, it is recognized that considerations such as these are even more significant in the context of mobile phones (e.g., smart phones), where it can prove even more inconvenient to scroll through multiple pages of results on a much smaller display, and with limited interaction modalities at hand.

BRIEF SUMMARY

In summary, one aspect of the invention provides a method of displaying results of one or more query searches, said method comprising: utilizing at least one processor to execute computer code that performs the steps of: obtaining query search results; determining, from the query search results, a plurality of object types; selecting one of the plurality of object types; identifying a primary instance of the selected object type; and displaying the search results on a single screen via showing the selected object type, the primary instance of the selected object type and at least one other object type selected from the plurality of object types.

Another aspect of the invention provides an apparatus displaying results of one or more query searches, said apparatus comprising: at least one processor; and a computer readable storage medium having computer readable program code embodied therewith and executable by the at least one processor, the computer readable program code comprising: computer readable program code configured to obtain query search results; computer readable program code configured to determine, from the query search results, a plurality of object types; computer readable program code configured to select one of the plurality of object types; computer readable program code configured to identify a primary instance of the selected object type; and computer readable program code configured to display the search results on a single screen via showing the selected object type, the primary instance of the selected object type and at least one other object type selected from the plurality of object types.

An additional aspect of the invention provides a computer program product for displaying results of one or more query searches, said computer program product comprising: a computer readable storage medium having computer readable program code embodied therewith, the computer readable program code comprising: computer readable program code configured to obtain query search results; computer readable program code configured to determine, from the query search results, a plurality of object types; computer readable program code configured to select one of the plurality of object types; computer readable program code configured to identify a primary instance of the selected object type; and computer readable program code configured to display the search results on a single screen via showing the selected object type, the primary instance of the selected object type and at least one other object type selected from the plurality of object types.

A further aspect of the invention provides a method comprising: obtaining query search results; determining, from the query search results, a plurality of object types; selecting one of the plurality of object types, via consulting a collection of domain ontologies; selecting an additional one or more of the plurality of object types; identifying a primary instance of the selected object type; and displaying the search results on a single screen via: showing the selected object type and the selected additional one or more of the plurality of object types in accordance with a rank order; and showing the primary instance of the selected object type; wherein the selected object type and the selected additional one or more of the plurality of object types comprise: one or more previously browsed object types; and an object type being currently browsed.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
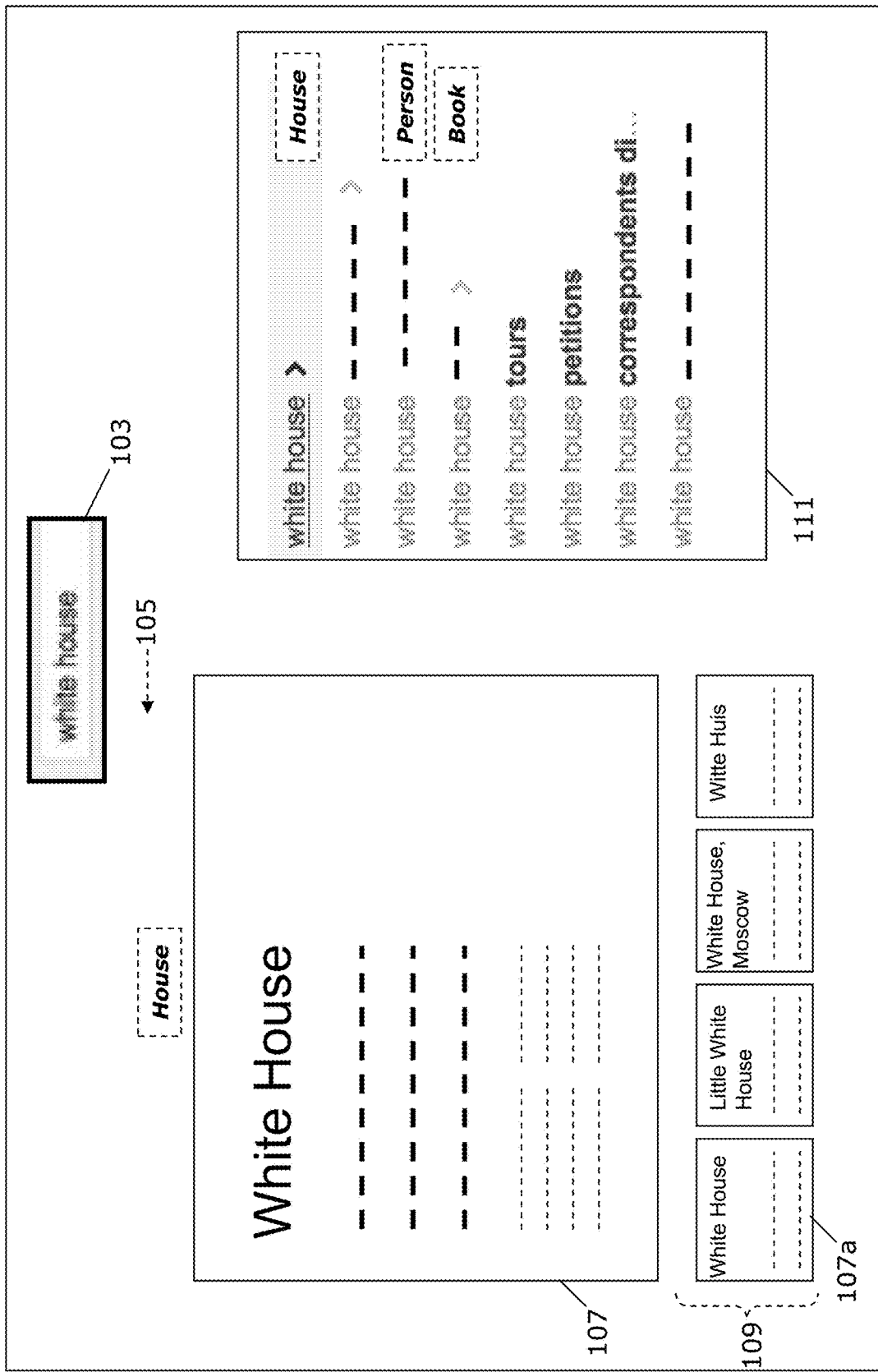
FIG. 1 schematically illustrates a visual display of results of a single search.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

Specific reference will now be made here below to FIG. 1-5. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 7. In accordance with an exemplary embodiment, most if not all of the process steps, components and outputs discussed with respect to FIGS. 1-5 can be performed or utilized by way of a processing unit or units and system memory such as those indicated, respectively, at 16' and 28' in FIG. 7, whether on a server computer, a client computer, a node computer in a distributed network, or any combination thereof.

Broadly contemplated herein, in accordance with at least one embodiment of the invention, are systems and methods for visualizing results of a single query, via performing a search using a query phase, clustering results based on object types that are learned using a collection of type ontologies, and showing a best matching object type and its top-ranking instances, along with other object types. Further, there are broadly contemplated herein systems and methods for visualizing results of a series of queries, via performing a search using a query phase, clustering results based on object types that are learned using a collection of type ontologies, and showing previously navigated object types and top instances. There can also be involved the showing of a currently best-matching object type and its top instances, and showing other unexplored object types. Additionally, there may be provided a clustering of results uses additional clustering metrics, and/or visualization that is optimized for mobile devices.

The features discussed above, and others, relating to at least one embodiment of the invention, will be better appreciated from the discussion which follows.

In accordance with at least one embodiment of the invention, there are broadly contemplated herein methods and arrangements for using a query system to perform a search on a document collection, and to learn an object type for each result using concepts and relationships from a collection of object-type ontologies. An object type can be understood to correspond to a category under which search results can be grouped to distinguish the same from other search results (e.g., "house" vs. "person" vs. "book"). As is known, an ontology can represent a store of information which can assist in such classification; a domain ontology models a specific domain. By way of illustrative example, for an ontology, its object-type-signature can be defined to represent the top-N concepts (terms) with the highest degree (in a graph sense). Thus, in a specific working example, if N=5 and the ontology is "Friend-of-a-Friend" (FOAF; see [http] xmlns [dot] com/foaf/spec/), its candidate signature will be {Agent, Person, Organization, Document, Image}. (For background purposes, a sample visual representation of the FOAF ontology is shown here: [http] vowl.visualdataweb [dot] org/v1/.)

In accordance with at least one embodiment of the invention, to obtain the object type of a result, the words of each result are matched with the signatures of all domain ontologies in a candidate space. The best object type of a search result is assigned on the basis of its corresponding to the ontology with the highest signature match. Results are then clustered based on object type, and can be shown in accordance with a single search or sequential search, as deemed appropriate (this will be more fully appreciated from the ensuing discussion).

In accordance with at least one embodiment of the invention, a provision is provided for displaying query search results in constrained fashion, e.g., on a single screen or in a single page (e.g., on an interface as may be associated with a desktop computer, or mobile device such as a laptop computer, tablet or mobile phone (e.g., smart phone) and in a form that could be visual, textual, or both. As will be appreciated from the ensuing discussion, these general concepts can be applied to a single search or a series (or sequence) of searches, alike.

In accordance with a general background relative to at least one embodiment of the invention, simply by way of illustrative example, a search for "White House" can yield a very large number of results, on a multitude of pages that a user will need to click or scroll through. While the most likely object type in that connection is "house", a typical search will also reveal results related to other object types such as "person", "book", "event", etc. The user may well only be interested in one of these object types. Further, whereas the most likely instance within the object type "house" may well be the White House in Washington, D.C., there are other instances representing other houses in which the user may well be interested.

Accordingly, in accordance with at least one embodiment of the invention, display for a single search can involve approaching the search as one for objects (e.g., physical or abstract) that are of a particular type, and where both the type and instance of interest are unknown. As such, broadly contemplated herein is the displaying of a best matching object type and likely instances that may be of interest to the user. While this can then well amount to a more compact display of results, this could also involve, in a meaningful manner, exceeding the level of detail normally shown conventionally (e.g., document title, URL, some snippet or extract of the document). Also broadly contemplated herein is the displaying of alternative object types that may match a user's intent; this may be done without showing extraneous details that otherwise could be produced without knowledge of a user's object types of interest.

FIG. 1 schematically illustrates a visual display of results of a single search, in accordance with at least one embodiment of the invention, as just described. It should be understood that the example of FIG. 1 is provided merely by way of illustration by way of highlighting basic concepts that are broadly contemplated herein. As shown, display 101 may show the original search entry (103) and then, in a first (general) section 105 of the display 101 (towards the left), instances of a best matching object type; here the most likely object type is "house" (which need not necessarily be explicitly labeled as such on the display) for an original search, "white house". A most likely instance 107 can then be displayed prominently, and several instances in general (109) can be displayed underneath (including, a smaller display of the most likely instance, 107a). At a second (general) section 111 of the display 101 (towards the light), a display of alternative object types can be provided. This can be accomplished in essentially any suitable manner; here, there are included several prospective expanded search entries, in addition to the original ("white house"), along with an indication of some object types. Again, the object types ("house", "person", "book") need not necessarily be explicitly labeled in the actual display but are shown here for illustration and reference.

In accordance with at least one embodiment of the invention, a provision is provided for displaying sequential search results (that is, results of a sequence or series of searches) in constrained fashion, e.g., on a single screen or in page, and in a form that could be visual, textual, or both. As such, display for sequential search can involve showing a form of history, with object types that the user had gone through and the top instance (especially to the extent that the top instance may already be stored in cache). Such a display can also include prospective future object instances of the explored types, or future object types which are not necessarily close to the ones already one seen.

Figure 2:
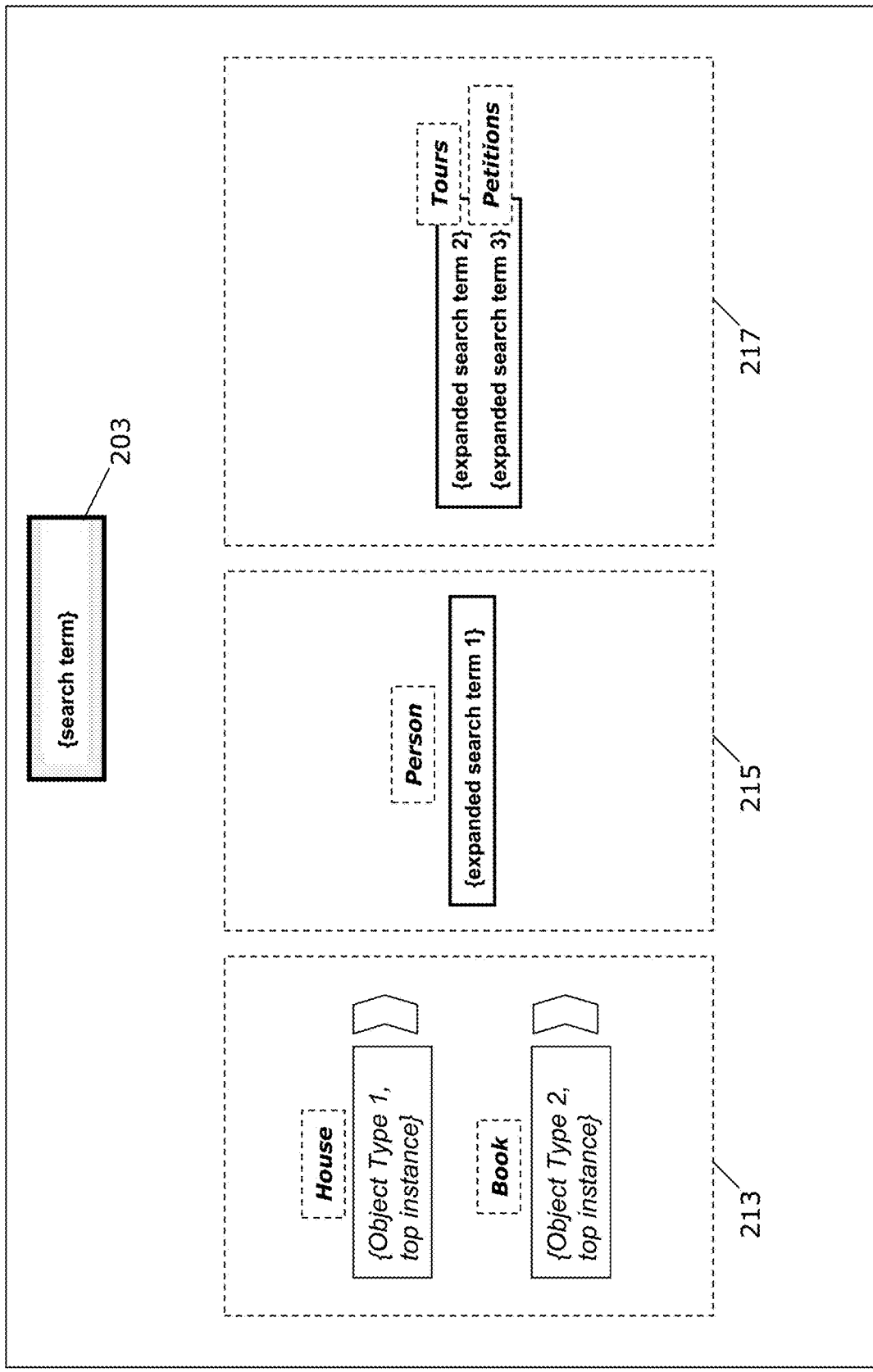
FIG. 2 schematically illustrates a first example of a visual display of results of a sequence of searches.

FIG. 2 schematically illustrates a visual display of results of a sequence of searches, in accordance with at least one embodiment of the invention, as just described. It should be understood that the example of FIG. 2 is provided merely by way of illustration by way of highlighting basic concepts that are broadly contemplated herein. As shown, display 201 may show the original search entry (203) and then, in a first (general) section 213 of the display 201 (towards the left), an indication of object types already browsed along with a top instance for each. In a second (general) section 215 of the display 201 (towards the middle), a currently browsed object can be displayed in terms of its top instance; here, the display of the top instance takes the form of an expanded version of the original search term. In a third (general) section 217 of the display 201 (towards the right), a display of likely additional object types can be provided. This can be accomplished in essentially any suitable manner; here, there are included some prospective expanded search entries. In all sections 213/215/217, the object types ("house", "book", "person", "tours", "petitions") need not necessarily be explicitly labeled in the actual display but are shown here for illustration and reference.

Figure 3:
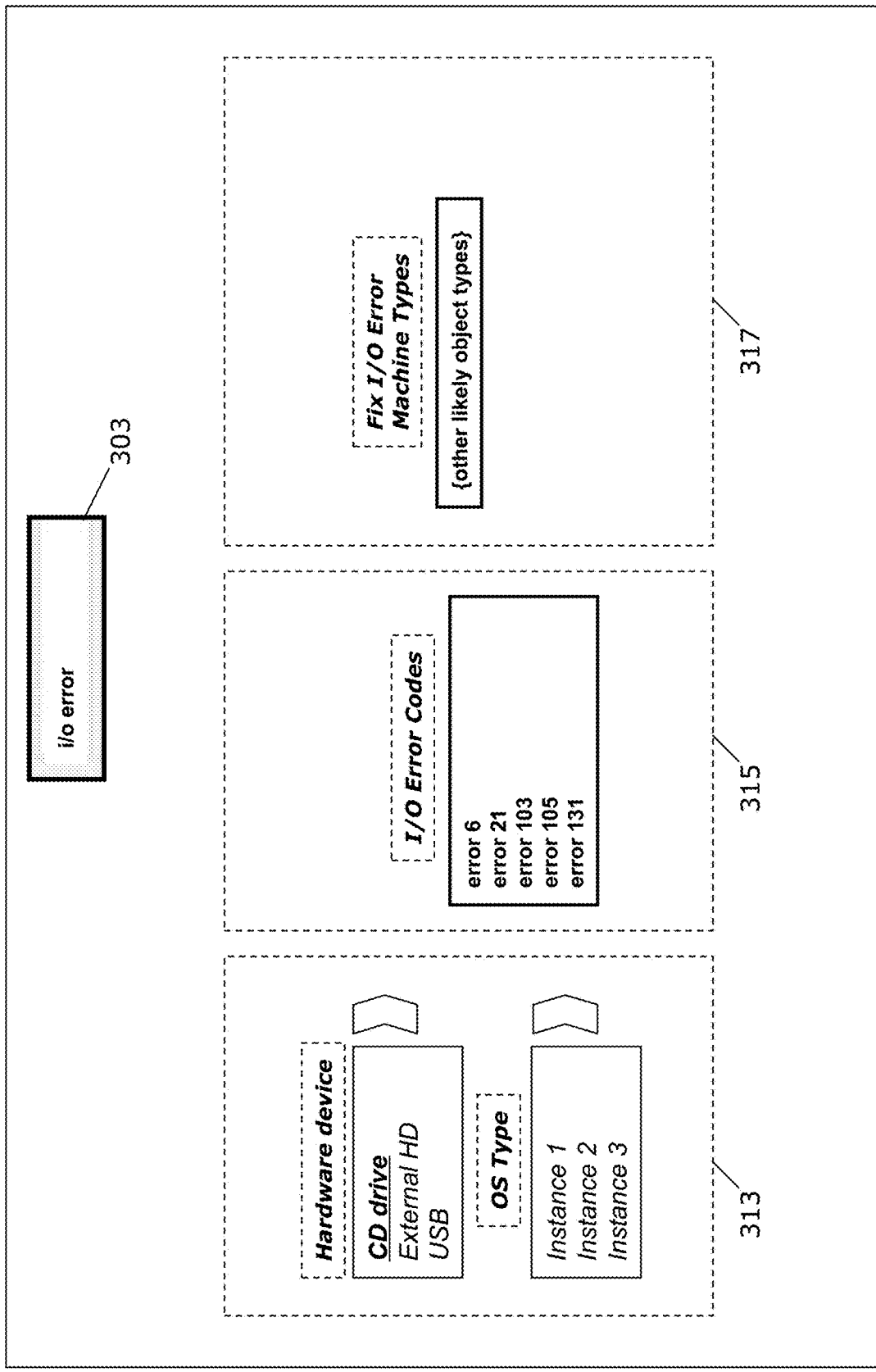
FIG. 3 illustrates a second example of a visual display of results of a sequence of searches.

In accordance with at least one embodiment of the invention, it can be appreciated that a wide variety of domains and object types may be accommodated. In accordance with another working example, as shown in FIG. 3, in an IT (information technology) scenario, if a user has searched (303) for issues with I/O (input/output), the already browsed object types (313) may thus show machine types, OS (operating system) types, device types, codes, etc. If the user previously selected, e.g., "CD drive" (emphasized in the drawing for illustrative purposes), instances in (or of) the OS object type may then be organized in a manner reflective of relevance. Particularly, inasmuch as the available domain ontology may not have had a link between a given computer type and CD drive (inasmuch, e.g., as such a computer type might not support a CD drive), then such a computer type may be listed at the bottom. As also shown illustratively, a current object type (I/O error codes) can be displayed (315), followed by likely additional object types (317).

In accordance with at least one embodiment of the invention, in the context of essentially any display as contemplated herein, the order of instances can ranked under each object type, using the history of past accessed objects.

Figure 4:
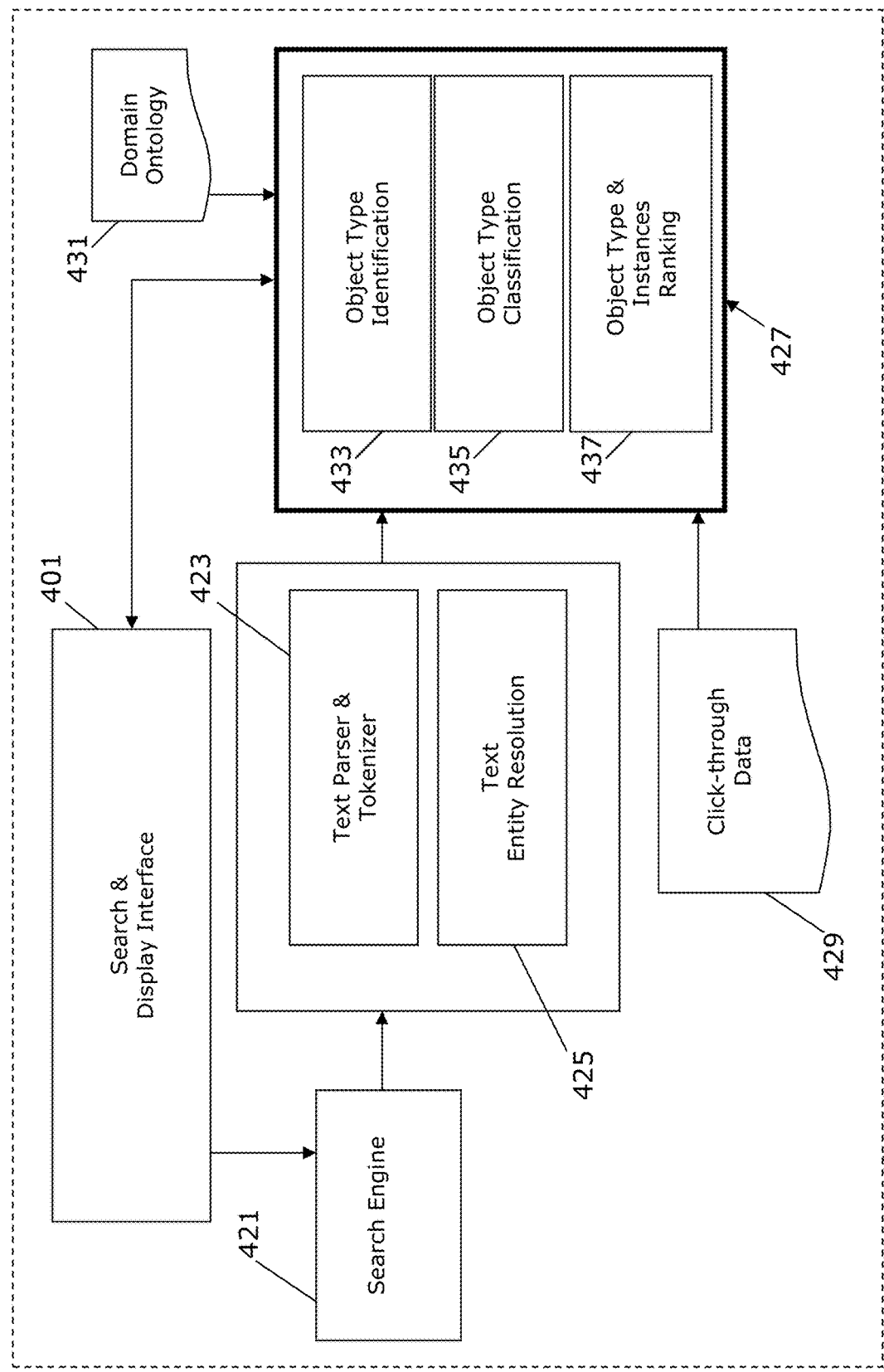
FIG. 4 schematically illustrates a general system architecture.

FIG. 4 schematically illustrates a general system architecture (419) that may be employed in accordance with at least one embodiment of the invention, utilizing components and resources as discussed heretofore. As such, the user can enter his/her search query via a search and display interface 401. Inasmuch as embodiments of the invention are involved with displaying search results, it can be appreciated that embodiments may essentially employ any suitable search engine; thus, inasmuch as a search engine 421 is provided, other components of the system architecture 419 may largely be agnostic thereto.

In accordance with at least one embodiment of the invention, given an input search term and a ranked list of results that are returned by the search engine 421, these inputs are processed by a text parser and tokenizer 423 in order to identify the words and phrases. Further, a text entity resolution processor 425 is then used to identify the entities being mentioned in text. (By way of illustrative example, "entities" could correspond to items such as names of persons and addresses, regardless of different variations in expressing these; thus, entity resolution helps resolve such variations. For background purposes, an illustrative example of entity resolution can be found here: [http]//www.datacommunitydc [dot] org/blog/2013/08/entity-resolution-for-big-data.) The collection of results, with textual tokens and identified entities, is then consumed in a next phase that produces final data (427) for display. Here, click-through data 429 (with results corresponding to what a user has already seen) are included and a domain ontology 431 may be referred to (e.g., in a manner as discussed heretofore). Thus, object types are identified (433) and classified (435) from the entities and tokens, and object types and instances of each type are ranked (437) based on relevance to the query. The resulting data set 427 is then passed for display (401).

Figure 5:
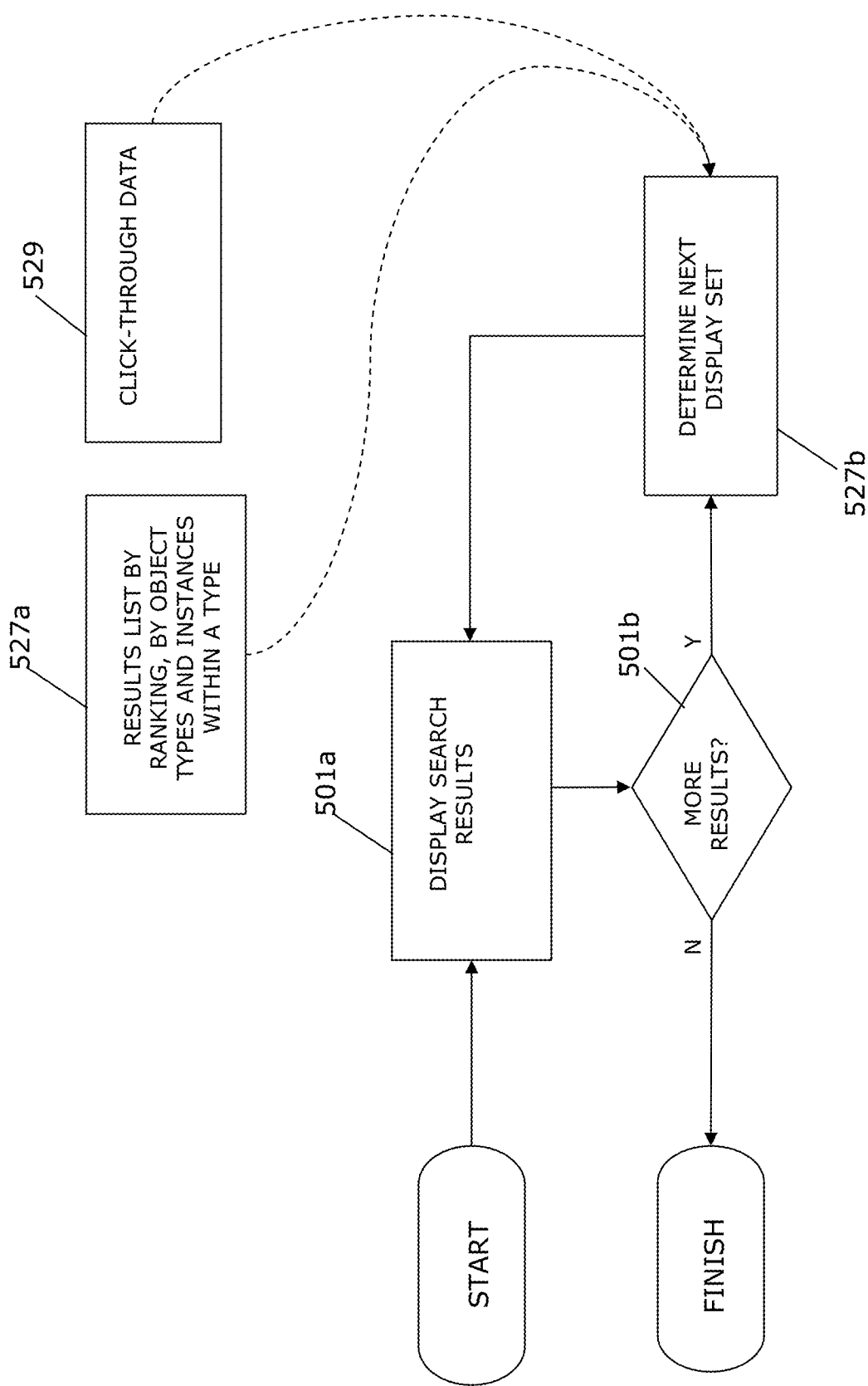
FIG. 5 schematically illustrates a process for updating a display of search results based on user interaction for the same query.

In accordance with at least one embodiment of the invention, FIG. 5 schematically illustrates a process for updating a display of search results based on user interaction for the same query; thus, this can apply to the case of sequential searches discussed heretofore. As such, if the user has conducted a search, with search results displayed on a screen (501*a*), and then (501*b*) decides to see more results, the result set 527*a* (which includes documents, the ranked object types they refer to and ranked instances) and click through data 529 are used to determine the next display set 527*b*. The latter includes: object types and instances already seen; the current object type and top K instances; and the remaining types and instances (e.g., all instances or a subset thereof). These are then displayed (501*a*), with a possibility of then displaying even further results (501*b*).

In view of the foregoing, it can be appreciated that various advantages may be enjoyed in accordance with at least one embodiment of the invention. For instance, on a display a visual abstraction is provided over a space (or in the context) of search results, based on object types, and this abstraction is cognitively easy to follow. This can lead to a faster display of results that will be meaningful to a user. Embodiments as broadly contemplated herein are particularly beneficial where the physical space for displaying results is markedly small.

In brief recapitulation, it can be appreciated from the foregoing that, in accordance with at least one embodiment of the invention, search may be focused on objects of unknown type, and not on documents. Thus, a distinction is made between object types and instances in search results for visualization and user experience. This can be adopted for results of a single query, or a series of queries. Further, instances of a current object type can be ranked using past accessed object types.

It can be appreciated from the foregoing that, in accordance with at least one embodiment of invention, a technical improvement is represented at least via systems and methods for visualizing results of a single query, via performing a search using a query phase, clustering results based on object types that are learned using a collection of type ontologies, and showing a best matching object type and its top-ranking instances, along with other object types.

In accordance with at least one embodiment of the invention, very generally, quantitative values as determined herein, or other data or information as used or created herein, can be stored in memory or displayed to a user on a screen, as might fit the needs of one or more users.

Figure 6:
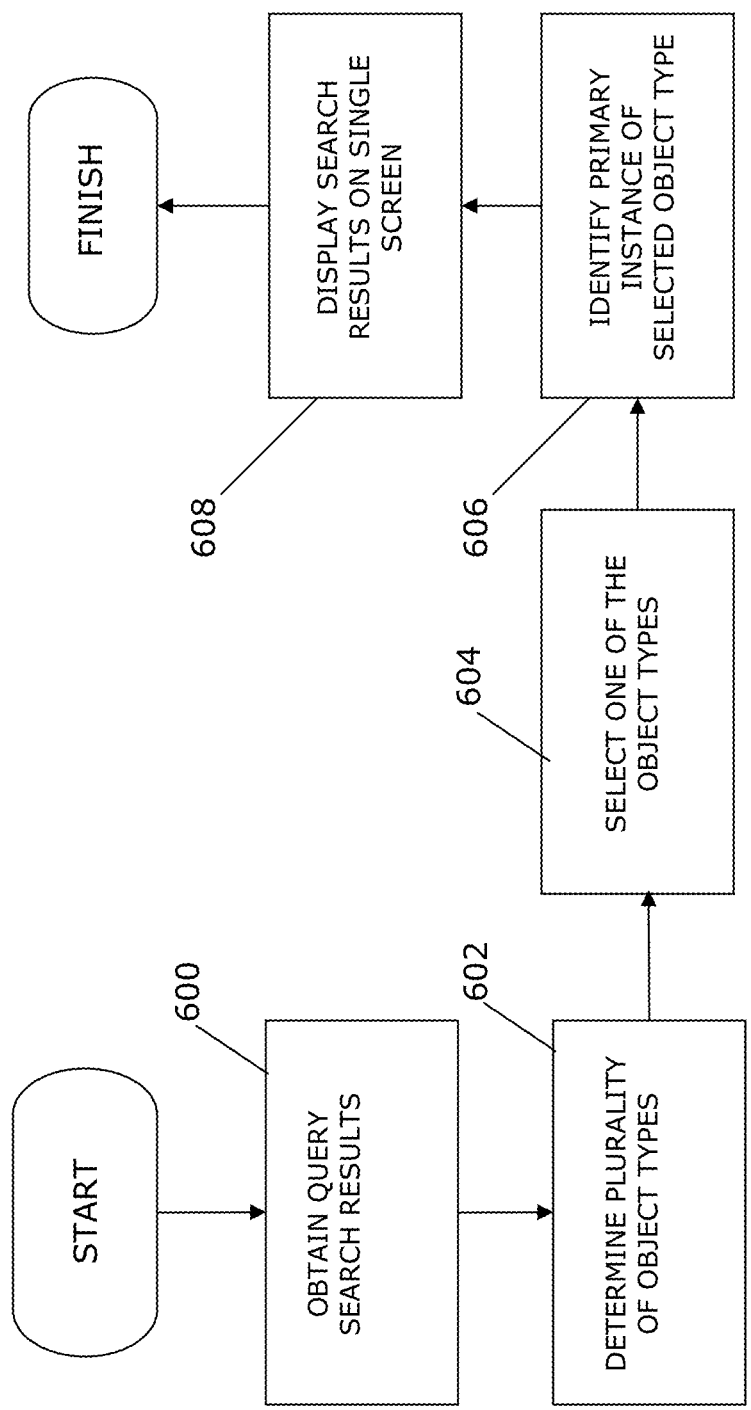
FIG. 6 sets forth a process more generally for displaying results of one or more query searches.

FIG. 6 sets forth a process more generally for displaying results of one or more query searches, in accordance with at least one embodiment of the invention. It should be appreciated that a process such as that broadly illustrated in FIG. 6 can be carried out on essentially any suitable computer system or set of computer systems, which may, by way of an illustrative and non-restrictive example, include a system such as that indicated at 12' in FIG. 7. In accordance with an example embodiment, most if not all of the process steps discussed with respect to FIG. 6 can be performed by way of a processing unit or units and system memory such as those indicated, respectively, at 16' and 28' in FIG. 7.

As shown in FIG. 6, in accordance with at least one embodiment of the invention, query search results are obtained (600) and there are determined, from the query search results, a plurality of object types (602). One of the plurality of object types is selected (604), and a primary instance of the selected object type is identified (606). The search results are displayed on a single screen via showing the selected object type, the primary instance of the selected object type and at least one other object type selected from the plurality of object types (608).

Figure 7:
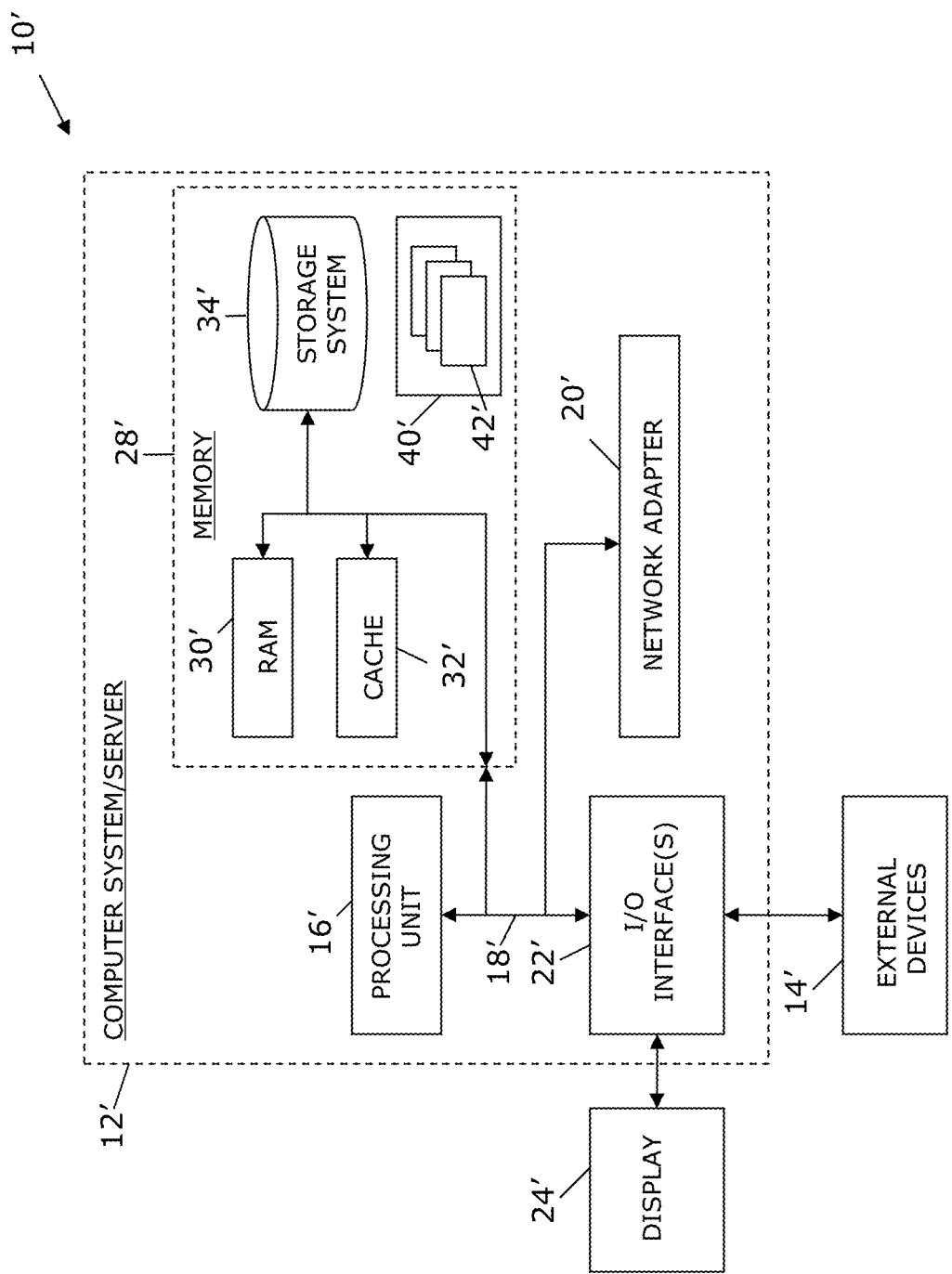
FIG. 7 illustrates a computer system.

Referring now to FIG. 7, a schematic of an example of a computing node is shown. Computing node 10' is only one example of a suitable computing node and is not intended to suggest any limitation as to the scope of use or functionality of embodiments of the invention described herein. Regardless, computing node 10' is capable of being implemented and/or performing any of the functionality set forth hereinabove. In accordance with embodiments of the invention, computing node 10' may be part of a cloud network or could be part of another type of distributed or other network (e.g., it could represent an enterprise server), or could represent a stand-alone node.

In computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of displaying results of a plurality of query searches, said method comprising:
  utilizing at least one processor to execute computer code that performs the steps of:
  receiving, from a user, a search query;
  obtaining query search results based upon the search query, wherein each of the query search results is processed into textual tokens and identified entities using a text parser and tokenizer;
  determining, from the query search results, a plurality of object types, wherein each of the object types corresponds to a domain within a domain ontology, wherein the domain ontology comprises a plurality of object types corresponding to textual tokens and identified entities;
  determining, for each object type of a first set of object types of the plurality of object types, top-k object instances;
  displaying the query search results on a single screen via showing the first set of object types and the top-k object instances for each of the first set of object types;
  receiving a selection, from the user, of a first object instance from one of the displayed object instances; and
  reorganizing the display of the query search results to include an additional object type from the plurality of object types, the additional object type not being included in the first set of object types and top-k object instances associated with the additional object type, and determining a new set of top-k object instances for at least a first object type of the first set of object types based on the user selection.

2. The method according to claim 1, wherein said displaying comprises showing a second set of object types and associated top-k object instances for at least one other set of object types selected from the plurality of object types.

3. The method according to claim 1, wherein said displaying comprises displaying on a mobile phone screen.

4. The method according to claim 1, wherein said displaying comprises displaying results of a single search.

5. The method according to claim 1, wherein said displaying comprises displaying results of a series of searches.

6. The method according to claim 1, wherein said displaying comprises showing one or more previously browsed object types.

7. The method according to claim 6, comprising:
  identifying a primary instance in each of the previously browsed object types;
  said displaying comprising showing the primary instance from each of the one or more previously browsed object types.

8. The method according to claim 6, wherein said displaying comprises showing an object type being currently browsed.

9. The method according to claim 8, comprising:
  identifying a primary instance in the object type being currently browsed;
  said displaying comprising showing the primary instance from the object type being currently browsed.

10. The method according to claim 8, wherein said displaying comprises showing one or more additional object types.

11. An apparatus displaying results of one or more query searches, said apparatus comprising:
  at least one processor; and
  a computer readable storage medium having computer readable program code embodied therewith and executable by the at least one processor, the computer readable program code comprising:
  computer readable program code configured to receive a search query;
  computer readable program code configured to obtain query search results based upon the search query, wherein each of the query search results is processed into textual tokens and identified entities using a text parser and tokenizer;
  computer readable program code configured to determine, from the query search results, a plurality of object types, wherein each of the object types corresponds to a domain within a domain ontology, wherein the domain ontology comprises a plurality of object types corresponding to textual tokens and identified entities;
  computer readable program code configured to determine, for each object type of a first set of object types of the plurality of object types, top-k object instances;
  computer readable program code configured to display the query search results on a single screen via showing the first set of object types and the top-k object instances for each of the first set of object types;
  computer readable program code configured to receive a selection, from the user, of a first object instance from one of the displayed object instances; and
  computer readable program code configured to reorganize the display of the query search results to include an additional object type from the plurality of object types, the additional object type not being included in the first set of object types and top-k object instances associated with the additional object type, and determining a new set of top-k object instances for at least a first object type of the first set of object types based on the user selection.

12. A computer program product for displaying results of one or more query searches, said computer program product comprising:
  a computer readable storage medium having computer readable program code embodied therewith, the computer readable program code comprising:
  computer readable program code configured to receive a search query;
  computer readable program code configured to obtain query search results based upon the search query, wherein each of the query search results is processed into textual tokens and identified entities using a text parser and tokenizer;

computer readable program code configured to determine, from the query search results, a plurality of object types, wherein each of the object types corresponds to a domain within a domain ontology, wherein the domain ontology comprises a plurality of object types corresponding to textual tokens and identified entities;

computer readable program code configured to determine, for each object type of a first set of object types of the plurality of object types, top-k object instances;

computer readable program code configured to display the query search results on a single screen via showing the first set of object types and the top-k object instances for each of the first set of object types;

computer readable program code configured to receive a selection, from the user, of a first object instance from one of the displayed object instances; and computer readable program code configured to reorganize the display of the query search results to include an additional object type from the plurality of object types, the additional object type not being included in the first set of object types and top-k object instances associated with the additional object type, and determining a new set of top-k object instances for at least a first object type of the first set of object types based on the user selection.

13. The computer program product according to claim 12, wherein the displaying comprises showing a second set of object types and associated top-k object instances for at least one other set of object types selected from the plurality of object types.

14. The computer program product according to claim 12, wherein the displaying comprises displaying results of a single search.

15. The computer program product according to claim 12, wherein the displaying comprises displaying results of a series of searches.

* * * * *